Figure 1:
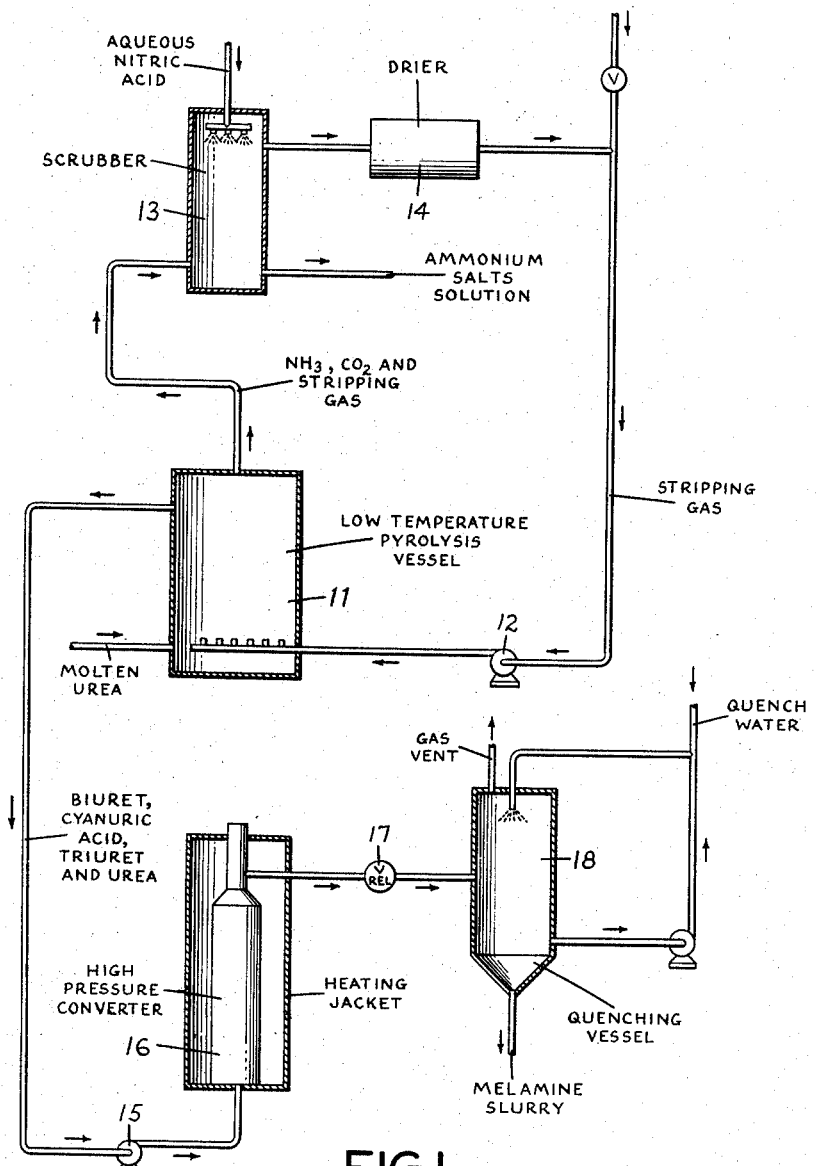

Dec. 22, 1959

C. H. HIBBITTS ET AL 2,918,467

PRODUCTION OF MELAMINE

Filed April 11, 1956

2 Sheets-Sheet 1

INVENTORS
FRED L. KELLY
CHARLES H. HIBBITTS
BY
ATTORNEY

United States Patent Office 2,918,467
Patented Dec. 22, 1959

2,918,467

PRODUCTION OF MELAMINE

Charles H. Hibbitts, Hopewell, and Fred L. Kelly, Chesterfield County, Va., assignors to Allied Chemical Corporation, a corporation of New York Application April 11, 1956, Serial No. 577,495

3 Claims. (Cl. 260—249.7)

This invention relates to the production of melamine by processes in which urea is first heated to decompose it, forming an intermediate pyrolysis product which is subsequently heated under high pressure to produce melamine.

It is known that melamine may be produced by heating urea in a closed pressure-resistant vessel to temperatures of about 300° C. and higher under the high, autogenous pressures generated by the gases evolved from the heated materials; those gases principally consisting of ammonia and carbon dioxide. It is also known that at temperatures of the order of 150°–200° C. and higher, one or more of the compounds biuret, cyanuric acid, ammelide and ammeline are formed. Finally, when heated in a closed autoclave, biuret at 300°–350° C. and cyanuric acid with added ammonia at 300°–400° C. react to form melamine under the high pressures developed in the autoclave. Especially in the case of charging biuret, cyanuric acid, ammelide or ammeline to the autoclave, the addition of a substantial quantity of ammonia has been considered advisable in order to better the yields of melamine.

It is particularly the objective of our invention to provide a process for the production of melamine starting with urea, in which the corrosion of the apparatus employed is minimized; the transfer to the reacting materials of the heat required for their reaction is facilitated and is substantially decreased; and high melamine production rates for a given installation are obtained.

Contrary to the teachings of the prior art, we have now discovered that high yields of melamine may be obtained based on the quantity of urea supplied as the starting material, with marked improvements in operation of the process in the foregoing respects, by first heating urea at relatively low temperatures, i.e. temperatures in the range about 135° C. to about 215° C., under partial pressures of the gaseous materials evolved by this heating which are far below the autogenously developed pressures when the urea is thus heated in a closed pressure-resistant vessel, so that gaseous products formed during this heating are removed from contact with the material being heated. Preferably, the urea is heated under pressures not substantially above atmospheric pressure and, better yet, is also stripped of gaseous reaction products formed by the pyrolysis reactions by passing in direct contact with the urea while it is being heated in a stripping gas, such as nitrogen or air, to aid in removing those gaseous products as they are formed. This first-step pyrolysis of urea is continued until at least 35% but not substantially more than 80%, preferably about 50% to 75% by weight of the urea supplied has been reacted and substantially all the ammonia (the principal gaseous reaction product) formed by this heating of the urea has been separated from the pyrolysis product. Other than undecomposed urea, the pyrolysis product of this first step is almost wholly composed of biuret, triuret and cyanuric acid.

The pyrolysis product of the first step of our process, or at least a portion of that pyrolysis product which contains the materials having low solubilities in water as compared with the solubility of the urea, separated from the gaseous reaction products evolved during its production, is heated to a higher temperature of about 300° C. or above under pressures at least about 500 p.s.i.g., while maintaining the pyrolysis product and reaction products thereof formed in this second step in contact with each other. About 500 p.s.i.g. to about 10,000 p.s.i.g. represents a suitable range of operating pressures. There is, however, no top limit to the pressures which may be used except that set by the practicability of constructing apparatus for operation at extremely high pressures. In addition to melamine, the product withdrawn from this second heating step under high pressure principally consists of ammelide, ammeline, ammonia and carbon dioxide, and unreacted urea.

Figure 2:
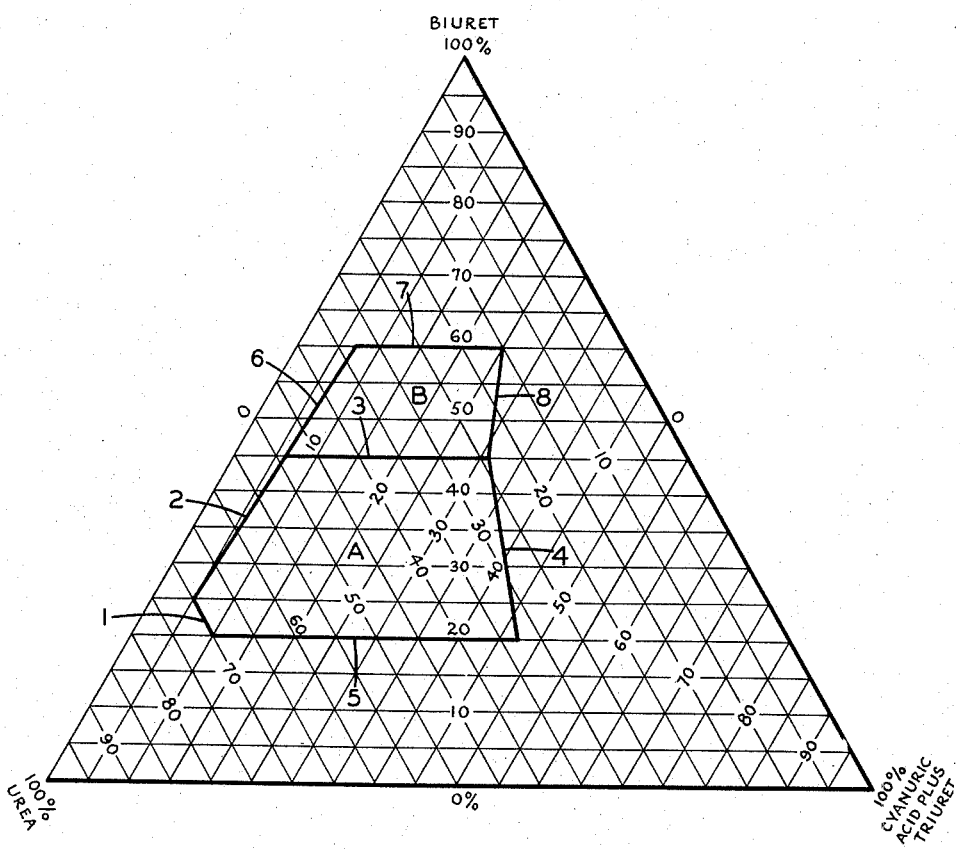

Fig. 1 of the accompanying drawings is a flow sheet showing processes for producing melamine in accordance with our invention, and diagrammatically illustrating an apparatus suitable for carrying out these processes. Fig. 2 is a three component diagram identifying the compositions of the urea pyrolysis products produced by the first step of our processes which are especially suitable for treatment in the second step for production of melamine.

Employing the particular apparatus and processes of Fig. 1, the melamine is obtained in the form of a crude, aqueous melamine slurry in water. Preferred procedures for employing our invention will be described in connection with the following detailed description of the apparatus of the drawing and of operation thereof to carry out processes embodying our invention.

With reference to this Fig. 1, urea is heated in a low temperature pyrolysis vessel 11 at temperatures in the range about 135° C. to about 215° C., preferably at about 160° to about 200° C., under substantially atmospheric pressure. Nitrogen gas is introduced from a pump 12 and intimately contacted with the heated material in vessel 11. The residence time of the materials being heated in this low temperature pyrolysis step to accomplish the required reaction of the urea, will depend upon the temperature employed, the pressure and the intimacy of contact of the stripping gas with the heated material. The nitrogen gas is supplied in quantities sufficient to strip from the material being heated substantially all the ammonia and carbon dioxide formed by pyrolysis of the urea.

The nitrogen accompanied by gaseous reaction products preferably is passed to a scrubber 13 where it is washed with an aqueous nitric acid. The ammonia and carbon dioxide are absorbed to form a solution of ammonium salts, ammonium carbonate or bicarbonate and ammonium nitrate, which may also contain free ammonia. The nitrogen gas is dried in a drier 14 and is recycled by pump 12 back into contact with the material being heated in low temperature pyrolysis vessel 11. Provision is made for introducing nitrogen gas into the gas recirculatory system comprising the pump, pyrolysis vessel, scrubber and drier in initially starting operations and as needed to supply make-up nitrogen.

The solution of ammonium salts is preferably neutralized with nitric acid to obtain a solution of ammonium nitrate suitable for use in the production of fertilizers. The carbon dioxide evolved, with added ammonia, may be employed for the production of urea.

The pyrolysis product of this low temperature step is passed by a pump 15, preferably under a pressure of about 1000 to about 4000 p.s.i.g., best at about 3000 p.s.i.g., into high pressure converter 16. Here the low temperature pyrolysis product is heated to at least about 300° C. for the conversion to melamine of materials present in that product. Available materials of construction for the high pressure melamine converter, the operating pressure and increasingly adverse corrosion and heat transfer conditions dictate the upper limits for the temperatures it is practicable to maintain. In general, the temperatures to which the material in the high pressure melamine converter is heated will be below 500° C., and it is preferred to heat it to about 350° to about 470° C.

In a preferred procedure, the product of this high pressure melamine conversion step is withdrawn from converter 16 through a pressure relief valve 17 and is introduced into a quenching vessel 18 and into contact with water to quench the material to, for example, a temperature below about 100° C. The melamine-containing product in part dissolves in the quench water and a crude melamine slurry is recovered from this quenching step. The slurry may be treated by any suitable method, several of which are known, to recover a solid melamine product therefrom, and this product may be further purified by any desired method. Aqueous mother liquors obtained in recovering the melamine from this slurry may be used as the quench water. This is particularly advantageous in the case of such liquors as contain residual melamine. This melamine may thus be recovered in the processing of the slurry from the quenching step.

In our preferred operation, the melamine slurry is diluted with water and stripped of ammonia and carbon dioxide at about 120° C. under 15 p.s.i.g. in a steam heated packed tower. The insoluble ammelide and ammeline are separated from the melamine in solution in the water by filtration of the hot liquor. Melamine is then crystallized by cooling the filtrate and is recovered by filtration. The crude melamine filter cake, with or without first drying it, may be subjected to further purification treatments to yield a melamine product of any higher, desired purity. Materials which may be converted to melamine or which it is otherwise desirable to incorporate in the feed to the high pressure melamine conversion step, may be recovered in treating the product of that step. Thus, it is particularly desirable to dry the ammelide and ammeline recovered by filtration after stripping ammonia and carbon dioxide from the hot melamine solution, as described above, and recycle them to converter 16 for their conversion into melamine.

In operating the process of our invention, the low temperature pyrolysis, or the high pressure melamine conversion step or both, may be carried out as a batch operation. For example, the product of the low temperature pyrolysis of the urea may be cooled to solidify it, stored, and later charged into an autoclave which is then heated to form melamine under the aforedescribed conditions for the high pressure step of our process.

Of especial importance in large-scale production of melamine, however, is the peculiar adaptability of the process of our invention to operating the high pressure step in a continuous manner, by pumping a fluidized urea pyrolysis product of the low temperature step into and through a vessel in which that product is heated by indirect heat exchange with a heating medium under the temperature and pressure conditions characterizing the high pressure, melamine conversion step of our process.

It is also highly advantageous in commercial operations that the low temperature pyrolysis may be carried out continuously when operating in accordance with our invention, and an important, preferred feature of our invention is that this step be carried out under conditions producing a pyrolysis product having a suitable fluidity at temperatures no higher than 215° C., better still at, or even somewhat below, the temperature to which it has been heated for its formation, e.g. at about the temperature at which it leaves the low temperature pyrolysis vessel, for the pyrolysis product to be pumped under high pressures into and through the reaction vessel in which it is heated in the melamine-forming step of our process. The conditions respecting temperature and time maintained in the low temperature pyrolysis essentially determine the composition of the resulting product with respect to its content of total cyanuric acid and triuret, urea and biuret. These in turn are determinative of the fluidity of that reaction product at the desirably elevated temperatures at which they are to be pumped into the high pressure reactor for production of melamine.

In pyrolyzing the urea at temperatures in the range 135° C. to 215° C., the higher temperatures in this range favor the formation of cyanuric acid and a higher total cyanuric acid plus triuret content in the pyrolysis product. The lower temperatures in this range favor the formation of biuret and a higher biuret content in the pyrolysis product. Further, as the biuret content of the pyrolysis product is increased from 20% to 45%, the maximum total cyanuric acid plus triuret in a product of suitable fluidity for it to be pumped into the high pressure step of our process decreases from about 47% to about 31%.

For any given temperature of operation of the low temperature pyrolysis which is below 150° C., within reasonable residence times, the total cyanuric acid and triuret present will not be sufficient to unduly decrease the fluidity of the pyrolysis product. When operating at temperatures above 150° C., however, the total cyanuric acid and triuret and the biuret contents vary significantly with the length of time the materials are heated in the low temperature pyrolysis step. For example, in pyrolysis of urea in which the reaction mixture is maintained at 165° C., and 1.5 mols of nitrogen per hour per mol of urea charged are passed in contact with the heated material to strip ammonia therefrom, the following table shows the variation in percent total cyanuric acid plus triuret and of biuret in the pyrolysis product.

| Reaction Time (Minutes) | Percent Biuret | Percent Cyanuric Acid + Triuret |
| --- | --- | --- |
| 30 | 31.2 | 6.1 |
| 60 | 40.9 | 11.9 |
| 90 | 43.8 | 17.8 |
| 120 | 42.7 | 23.0 |
| 150 | 39.6 | 28.4 |

Except for the last one, prepared with a reaction time of 150 minutes, all of the pyrolysis products of the above table were sufficiently fluid at 165° C. to be pumped into the high pressure step of our process. When the reaction time was 30 and 60 minutes, the products were clear, very mobile melts. When the reaction time was 120 minutes, a thick, less mobile, but still pumpable product was obtained. Heating this thick product to a temperature somewhat above 165° C. before passing it to the pump communicating with the high pressure vessel increases its fluidity and facilitates pumping it.

A very thick, much less mobile slurry, undesirably difficult to pump even at temperatures somewhat above 165° C. was obtained when the reaction time was 150 minutes. However, heating this reaction product to 185°–200° C. increases its fluidity and enables it to be pumped to the high pressure vessel. This method of operating is less desirable than operating the first step to produce a pyrolysis product adequately fluid to be readily pumped into the high pressure step of the process at a temperature no higher than that at which the lower temperature pyrolysis product leaves the vessel in which it is prepared.

In pyrolyzing the urea at 215° C. by a process in which urea is continuously introduced into the pyrolysis vessel and pyrolysis product is withdrawn therefrom before its cyanuric acid plus triuret content exceeds about 47%, a product with a high cyanuric acid plus triuret content up to about 47%, mobile and pumpable at 215° C., is obtained.

In preferred, large-scale processes operated in accordance with our invention, therefore, the temperature and reaction time maintained in the low temperature pyrolysis step should be so correlated that for a biuret content of 20%, the total cyanuric acid plus triuret content of the low temperature pyrolysis product does not exceed 47%, and as the biuret is increased from 20% to 45% there is a proportionate decrease in the total cyanuric acid plus triuret from 47% to 31%.

The previously known pyrolysis processes for converting urea to melamine have presented severe corrosion problems. In batch operation the high temperature required for rapid initial reaction of the urea and the changing composition of the reaction mixture presents severe corrosion conditions for any one material of construction for the apparatus in which the pyrolysis of the urea to melamine is carried out in one step. The process of our invention is especially advantageous, since it permits constructing each of the two reactors of a material peculiarly suited to resist corrosion under the particular and more uniform conditions prevailing therein. Thus, the low temperatures and pressures and low ammonia and water vapor content of the materials in the low temperature pyrolysis vessel make stainless steel 318 (Amer. Iron and Steel Inst. Standard) a suitable material of construction both with respect to its low rate of corrosion and the necessary mechanical properties of a material of construction for the reactor in which this first step of the process is carried out. Titanium metal is well adapted for service under the conditions prevailing in the vessel in which the pyrolysis product of the first step is heated at higher temperatures and pressures to form melamine.

Our invention is important in that it greatly simplifies the heat transfer problems in making melamine. The conversion of urea to melamine involves an input of a large quantity of heat at high temperatures to induce the necessary reactions. To provide for this in a single pyrolysis vessel, operating under high pressures is very costly. It is much more advantageous, operating in accordance with our invention, to supply a substantial proportion of the necessary heat requirements for the entire process to the materials treated in the first low temperature pyrolysis step carried out in low pressure equipment. The conversion to melamine of the mixtures predominantly composed of biuret, triuret and cyanuric acid in the second step of our process requires substantially less input of heat than the conversion of an equivalent amount of urea to melamine. Particularly in the case of cyanuric acid, its conversion to melamine requires only about 28% as much heat as the conversion of an equivalent quantity of urea to melamine. It is especially advantageous, therefore, to operate the first, low temperature pyrolysis step of our process to give a product high in cyanuric acid (within the limits set forth above) so that the maximum possible heat input is accomplished under the favorable low temperature and low pressure conditions prevailing in this first step of our process. To this end, we prefer to employ temperatures in the range about 160° C. to about 200° C. in the low temperature pyrolysis step.

Further, the elimination from the reaction mixture in the low temperature pyrolysis step of much of the ammonia resulting from urea pyrolysis and of incidental water accompanying the urea supplied to the process, as ammonia and carbon dioxide by reaction of the water with urea, reduces the amount of heat which must be supplied to reactants in the second step where melamine is formed.

As compared with the prior art one step processes for converting urea to melamine, the first step of our invention in which an intermediate pyrolysis product is formed requires lower temperatures to obtain a similar degree of urea pyrolysis. This lower temperature in itself results in more economic heat transfer and reduction in corrosion problems. In short, the lower operating temperatures in the first step, the lower quantities of heat which must be supplied at the higher temperatures favorable to melamine formation in the second step, and the smaller amounts of material which must be processed at these latter temperatures, all combine to improve substantially the economics of the processes of our invention as compared with those of the prior art.

The processes described above may be modified, while still employing our invention, to extract with water a relatively soluble portion of the urea pyrolysis product of the first step of our process. This will remove from it in solution in the water much of the urea present, leaving crude biuret solids for treatment in the second melamine-forming step of our process. The several advantages pointed out above for our two-step process over a single step of pyrolyzing urea to form melamine are obtained by such a modified process. This does involve, however, providing means for extracting with water the urea pyrolysis product, separating the aqueous extract from the solids and drying the solids before subjecting them to the melamine-forming conditions in the second step of our process. Nevertheless, under some circumstances it may be advantageous to employ this modification of our process for the large-scale production of melamine.

With reference to Fig. 2, areas A and B together define those compositions which, at a temperature no higher than 215° C., are sufficiently mobile to be pumped into the high pressure converter of the second step of our process where they are treated for production of melamine. The compositions of area A are produced directly by the pyrolysis of urea in the first step of our process. The compositions of area B are prepared by leaching or extracting with water a composition of area A produced by the pyrolysis of urea. This water extraction removes mainly urea, having a relatively high solubility in water, leaving a portion of the urea pyrolysis product with an increased content of materials having lower water solubilities than urea for treatment in the second step of our process. It is, however, within the scope of our invention to subject a urea pyrolysis product to a limited extraction with water to obtain a material having a composition still within area A which is then supplied as feed to step 2.

Areas A and B comprise all compositions of products produced by pyrolysis of urea substantially consisting of urea, biuret, cyanuric acid and triuret in proportions encompassed by the boundary line proportions shown in Fig. 2.

| | Urea, Percent | Biuret, Percent | Cyanuric acid plus triuret |
|---|---|---|---|
| Area A: | | | |
| Boundary 1 | 70 | 20 to 25 | 10% decreasing to 5% as biuret increases from 20% to 25%. |
| Boundary 2 | 70 to 49 | 25 to 45 | 5% increasing to 6% as urea decreases from 70% to 49%. |
| Boundary 3 | 49 to 24 | 45 | 6% increasing to 31% as urea decreases from 49% to 24%. |
| Boundary 4 | 24 to 33 | 45 to 20 | 31% increasing to 47% as biuret decreases from 45% to 20%. |
| Boundary 5 | 33 to 70 | 20 | 47% decreasing to 10% as urea increases from 33% to 70%. |
| Area B: | | | |
| Boundary 3 | 49 to 24 | 45 | 6% increasing to 31% as urea decreases from 49% to 24%. |
| Boundary 6 | 49 to 33 | 45 to 60 | 6% increasing to 7% as urea decreases from 49% to 33%. |
| Boundary 7 | 33 to 15 | 60 | 7% increasing to 25% as urea decreases from 33% to 15%. |
| Boundary 8 | 15 to 24 | 60 to 45 | 25% increasing to 31% as biuret decreases from 60% to 45%. |

For the compositions of Fig. 2, the stated percentages of the three components, biuret, urea and cyanuric acid plus triuret, are based on a total of 100% of these components. There may be present in the urea pyrolysis products supplied to the second step of our process a small amount (up to about 2%–3% by weight) of other compounds, such as ammonia. These are of no significance in the operation of our process. For all practical purposes the feed to the second step of our process substantially consists of urea, biuret, cyanuric acid and triuret.

The following specific examples are further illustrative of our invention and of various conditions under which it is suitably operated for melamine production. All quantities of materials given in parts or percentages are by weight, except when otherwise indicated. The synthetic urea product employed in these examples contained about 99% urea, about 0.5% water and about 0.2% biuret.

*Example 1.*—The molten, synthetic urea product is pumped into a reaction vessel in which it is heated at 165° C. under substantially atmospheric pressure for a residence period in the reaction vessel of 90 minutes. Gaseous nitrogen at the rate of 1.4 mols of nitrogen ($N_2$) per mol of urea is passed into and through the material being heated. The pyrolysis attack on the urea amounts to about 66 mol percent, with a small additional conversion of urea to ammonia and carbon dioxide by the moisture present in the urea feed. The pyrolysis product has substantially the following composition:

| | Percent |
|---|---|
| Biuret | 43.5 |
| Cyanuric acid | 12.0 |
| Triuret | 5.5 |
| Urea | 38.0 |
| Ammonia | 1.0 |

The nitrogen gas leaving the pyrolysis vessel is accompanied by ammonia and carbon dioxide evolved by reaction of the urea. The ammonia amounts to about 12% by weight of the urea supplied to the pyrolysis vessel and corresponds to about 66.5% decomposition of the urea fed to the pyrolysis vessel.

The pyrolysis product is solidified and stored and is then re-melted under 100 p.s.i.g. by heating to 160° C. The melt is pumped under 3000 p.s.i.g. through a tubular high pressure vessel within a heating jacket at the rate of 12 kilograms of the melt per liter of reaction space per hour. The residence period of the material being heated in this high pressure vessel is about 5 minutes. The reaction vessel is heated by a high temperature heat transfer medium passed through the jacket at temperatures such that the materials in the vessel are heated to about 400° C. before they leave the vessel.

The reaction products from the high pressure converter pass through a pressure reduction valve where they are let down to atmospheric pressure before being quenched with water to form a slurry having a temperature of about 90° C. The slurry, exclusive of the quench water, contains the following materials in substantially the stated percentages:

| | Percent |
|---|---|
| Melamine | 35.6 |
| Ammelide + ammeline | 2.6 |
| Ammonia | 19.3 |
| Carbon dioxide | 40.8 |
| Urea | 1.1 |
| Biuret | 0.6 |

The melamine yield is about 90 percent of theory based on the urea initially supplied to the low pressure pyrolysis step, assuming that 6 mols of urea form 1 mol of melamine.

The crude melamine slurry is stripped of ammonia and carbon dioxide under 15 p.s.i.g. pressure in a steam heated, packed column at 120° C. The slurry from the stripper is dried, leaving a cake of crude melamine.

*Example 2.*—The molten synthetic urea product is continuously pumped into and through a reaction vessel in which it is heated at 163°–167° C. under substantially atmospheric pressure for a residence period of 60 minutes in the reaction vessel. Gaseous nitrogen at the rate of 2.1 mols of $N_2$ per mol of urea per hour is passed into and through the material being heated. The pyrolysis attack on the urea amounts to about 58 mol percent, with a small additional conversion of urea to ammonia and carbon dioxide by the moisture present in the urea feed. The pyrolysis product has substantially the following composition:

| | Percent |
|---|---|
| Urea | 47 |
| Biuret | 38 |
| Cyanuric acid | 7 |
| Triuret | 7.5 |
| Ammonia | 0.5 |

The nitrogen gas leaving the pyrolysis vessel is accompanied by ammonia and carbon dioxide evolved by reaction of the urea. The volatiles amount to about 11.3% by weight of the urea supplied to the pyrolysis vessel.

The melt of pyrolysis product is pumped under 3000 p.s.i.g. through a high pressure vessel at the rate of 12 kilograms of the pyrolysis product per liter of reaction space per hour. The residence period of the material being heated in this high pressure vessel is about 5 minutes. The reaction vessel is externally heated to temperatures such that the materials in the vessel are heated to about 400° C. before they leave the vessel and are passed through a pressure let-down valve. Overall yield of melamine is 90% of theory, based on the urea supplied to the first step.

The following examples further illustrate conditions for carrying out the first step of our process to produce urea pyrolysis products which are suitably fluid at temperatures at which they are formed for them to be pumped into a high pressure vessel for treatment to produce melamine. The urea pyrolysis products of these examples are suitably treated for production of melamine in the manners described in the previous examples.

*Example 3.*—About 300 parts of the molten synthetic urea is heated in a vessel to which heat is applied externally. The temperature of the reaction mixture is raised to 215° C. in about 10 minutes. The mixture is thereafter maintained at about 210°–215° C. Over a period of hours, pyrolysis product is continuously withdrawn and fresh molten urea is added at the rate of 1500 parts of urea per hour while keeping the liquid level substantially constant in the reaction vessel. The reaction mixture is stirred constantly to prevent caking of any solid products on the hot surface of the reaction vessel. The pyrolysis attack on the urea is about 72 percent. The resulting product has the following composition:

| | Percent |
|---|---|
| Urea | 32.5 |
| Biuret | 21.2 |
| Cyanuric acid | 35.1 |
| Triuret | 8.7 |
| Ammonia | 1.6 |
| Ammelide | 0.9 |

This urea pyrolysis product is in the form of a slurry which is sufficiently fluid at 215° C. to be pumped to a high pressure reactor for conversion to melamine.

*Example 4.*—About 768 parts of the synthetic urea product are heated in an open reaction vessel at 185° C. under substantially atmospheric pressure. The melt depth is about 7 inches, and 1.5 mols of air per mol of urea per hour is passed into and through the material being heated. In a period of 30 minutes, the pyrolysis attack on the urea amounts to about 65.7% of urea charge. The pyrolysis product is turbid but fluid at 185° C., and has substantially the following composition:

| | Percent |
|---|---|
| Urea | 39.7 |
| Biuret | 30.3 |
| Cyanuric acid | 17.0 |
| Triuret | 12.2 |
| Ammonia | 0.8 |

The air leaving the pyrolysis vessel is accompanied by ammonia and carbon dioxide evolved by the reaction of urea. Volatiles amount to about 14.3% of the urea supplied to the pyrolysis vessel.

Employing this same procedure except that the urea is heated for 7 hours at 130°–135° C., the pyrolysis attack on the urea is about 56% and a pyrolysis product is obtained which is turbid but fluid at 130° C. and has substantially the following composition:

| | Percent |
|---|---|
| Urea | 47.0 |
| Biuret | 42.0 |
| Cyanuric acid and triuret | 10.5 |
| Ammonia | 0.5 |

*Example 5.*—A urea pyrolysis product prepared by the procedure described in Example 1 had the following composition:

| | Percent |
|---|---|
| Biuret | 43.8 |
| Urea | 38.3 |
| Cyanuric acid | 11.8 |
| Triuret | 5.6 |
| Ammonia | 0.5 |

This is melted at 150° C. under 100 p.s.i.g. and is continuously pumped at 3000 p.s.i.g. through a high pressure vessel at the rate of 15 kilograms/hour/liter of reactor space. Employing a reactor having a surface to volume ratio equivalent to an 0.75 inch I.D. tube, with outside temperatures of the reactor tube at 550°–600° C., the materials in the vessel are heated to about 400° C. before they leave the vessel and are passed through a pressure let-down valve. The product is quenched with water at 100° C. and 15 p.s.i.g. The material leaving the quencher after removal of carbon dioxide, ammonia, and water has the following composition by weight:

20.8 parts of melamine
1.5 parts of ammelide-ammeline
0.6 parts of urea
0.4 parts of biuret As pointed out above, under some conditions it may be desirable to employ a modification of the processes illustrated by the foregoing examples, in which a water extracted portion of the urea pyrolysis product is subjected in the second step of our process to the melamine-forming conditions. The following is an example of this method of operation.

*Example 6.*—Urea is heated at 165° C. for about 30 mins. at atmospheric pressure and with nitrogen stripping gas being passed through it, to obtain a pyrolysis attack on the urea of about 55% and to form a melt of the following approximate composition:

2183 parts (49.1%) urea
1685 parts (37.9%) biuret
14 parts (0.3%) ammonia
298 parts (6.7%) cyanuric acid
267 parts (6.0%) triuret This melt leaving the reactor is quenched with about twice its weight of water. The resulting mixture is cooled to 20° C. and aged at that temperature for about 15 mins. to effect substantially complete crystallization and promote crystal growth before it is filtered. About 1813 parts of urea, 485 parts of biuret, 102 parts of cyanuric acid, 39 parts of triuret, and 8 parts of ammonia are removed in the mother liquor. After evaporation of the water the solids, principally urea, recovered from the mother liquor may be recycled with make-up urea to the first step of the process for further conversion of the urea to its pyrolysis products. The solids recovered by the filtration have substantially the following composition in parts by weight:

1200 parts (60%) biuret
6 parts (0.3%) ammonia
370 parts (18.5%) urea
196 parts (9.8%) cyanuric acid
228 parts (11.4%) triuret This portion of the urea pyrolysis product has a higher content of those constituents of the pyrolysis product which have low solubilities in water compared with the solubility of urea in the water. It is dried at about 110° C. and is then supplied to the high pressure melamine reactor in which the second step of the process of our invention is carried out to produce melamine under any of the conditions heretofore described.

Employing the modification of our processes involving extraction of the urea pyrolysis product with water, illustrated by this last example, the extraction with water is limited to leave in the recovered solids at least 15% urea and no more than 60% biuret. Further, the urea, biuret and total cyanuric acid plus triuret contents of the recovered solids may still be within area A of Fig. 2 of the drawings, but preferably, when extraction with water is employed, this is carried far enough so that the composition of the recovered solids is in area B. Control of the composition of the solids recovered by extraction of the urea pyrolysis products of the first step of our process, in which at least 35% but not substantially more than 80% of the urea has been reacted, is accomplished by control of the amount of water used for extracting the urea pyrolysis product by any given procedure and conditions of operation employed for the extraction.

We claim:

1. In a process for the production of melamine from urea as the starting material that improvement which comprises step 1, heating said urea at temperatures of about 160° C. to about 215° C. in a low pressure zone under a pressure not substantially above atmospheric while removing from contact with the material being heated the gaseous reaction products, principally ammonia, formed during said heating, continuing said heating until a hot urea pyrolysis product is formed containing no less than 20% and no more than 45% biuret, no more than 70% urea and no less than 24% urea when the biuret amounts to 45%, proportionately increasing to no less than 33% urea as the biuret content decreases from 45% to 20%, the remainder of said urea pyrolysis product substantially consisting of cyanuric acid plus triuret amounting to at least 6%, and step 2, pumping resulting pyrolysis product at a temperature no higher than 215° C. at which it is fluid, into a high pressure zone and heating it therein under pressures of at least about 500 p.s.i.g. at temperatures of at least about 300° C. to form melamine while maintaining the pyrolysis product and reaction products formed in the high pressure zone in contact with each other.

2. The process of claim 3 in which the urea pyrolysis product of step 1 is heated in step 2 at temperatures of about 350° C. to about 470° C. under pressures of about 1000 p.s.i.g. to about 4000 p.s.i.g. to form melamine.

3. The process of claim 1 in which the urea is passed in step 1 in indirect heat exchange with a heating medium to heat it at temperatures of about 160° C. to about 200° C., and the urea pyrolysis product of step 1 is passed in step 2 in indirect heat exchange with a heating medium to heat it at temperatures of at least about 300° C.

References Cited in the file of this patent

UNITED STATES PATENTS

| 2,769,005 | Walter | Oct. 30, 1956 |

FOREIGN PATENTS

| 726,290 | Germany | Aug. 27, 1942 |
| 598,175 | Great Britain | Feb. 12, 1948 |
| 628,255 | Great Britain | Aug. 25, 1949 |
| 639,962 | Great Britain | July 12, 1950 |